(12) United States Patent
Al Gharbi et al.

(10) Patent No.: US 11,215,033 B2
(45) Date of Patent: Jan. 4, 2022

(54) DRILLING TROUBLE PREDICTION USING STAND-PIPE-PRESSURE REAL-TIME ESTIMATION

(71) Applicant: Saudi Arabian Oil Company, Dhahran (SA)

(72) Inventors: Salem H. Al Gharbi, Dhahran (SA); Ramzi Miyajan, Dhahran (SA); Musab Al Khudiri, Dhahran (SA); Ali Wuhaimed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 253 days.

(21) Appl. No.: 15/981,138

(22) Filed: May 16, 2018

(65) Prior Publication Data
US 2019/0353012 A1    Nov. 21, 2019

(51) Int. Cl.
*G06F 16/00*         (2019.01)
*E21B 44/00*         (2006.01)
(Continued)

(52) U.S. Cl.
CPC ......... *E21B 41/0092* (2013.01); *E21B 44/00* (2013.01); *E21B 44/06* (2013.01);
(Continued)

(58) Field of Classification Search
CPC ........ G06F 16/84; G06F 16/358; G06F 16/68; G06F 16/22; G06F 16/34; G06F 16/54;
(Continued)

(56) References Cited

U.S. PATENT DOCUMENTS

| 4,845,628 A * | 7/1989 | Gray ..................... E21B 44/00 |
| | | 702/9 |
| 5,952,569 A | 9/1999 | Jervis et al. |

(Continued)

FOREIGN PATENT DOCUMENTS

| WO | WO2014160561 A1 * | 10/2014 |
| WO | WO2016209230 A1 * | 12/2016 |
| WO | WO2018029454 A1 * | 2/2018 |

OTHER PUBLICATIONS

Mazeda Tahmeen et al., "Development of an Intelligent System for the Analysis of both Static and Real-time Oil and Gas Well Drilling Data", Published by Canadian Center of Science and Education, Modern Applied Science, , vol. 4, No. 12; Dec. 2010, pp. 1-16.*

(Continued)

*Primary Examiner* — Srirama Channavajjala
(74) *Attorney, Agent, or Firm* — Fish & Richardson P.C.

(57) ABSTRACT

Raw, real-time drilling data is pulled from a centralized database for processing. The raw, real-time drilling data is re-formatted into a format required for processing by one or more predictive models. Real-time processing is performed with respect to one or more drilling parameters associated with the re-formatted data using the one or more predictive models to generate output data. The output data received from the one or more predictive models is re-formatted for storage in the centralized database. The reformatted output data is retrieved from the centralized database for analysis with respect to visualization, generating alerts, or generating recommendations.

20 Claims, 8 Drawing Sheets

(51) Int. Cl.
*G06N 20/00* (2019.01)
*E21B 41/00* (2006.01)
*G06F 16/84* (2019.01)
*G06F 16/25* (2019.01)
*E21B 47/00* (2012.01)
*E21B 44/06* (2006.01)
*G06N 5/02* (2006.01)
*E21B 21/08* (2006.01)
*E21B 45/00* (2006.01)
*E21B 47/09* (2012.01)

(52) U.S. Cl.
CPC ............ *E21B 47/00* (2013.01); *G06F 16/258* (2019.01); *G06F 16/84* (2019.01); *G06N 5/02* (2013.01); *G06N 20/00* (2019.01); *E21B 21/08* (2013.01); *E21B 45/00* (2013.01); *E21B 47/09* (2013.01)

(58) Field of Classification Search
CPC ...... G06F 16/74; G06F 16/252; G06F 16/258; G06F 16/287; E21B 43/34; E21B 49/00; E21B 47/00; E21B 44/00; E21B 21/08; E21B 47/06; E21B 47/10; E21B 47/18; E21B 7/00; E21B 49/005; E21B 49/003; E21B 34/06; E21B 44/02; E21B 41/00; G06N 20/00; G06N 5/02
See application file for complete search history.

(56) References Cited

U.S. PATENT DOCUMENTS

| | | | |
|---|---|---|---|
| 6,724,687 B1 * | 4/2004 | Stephenson | G01V 1/40 367/32 |
| 6,820,702 B2 | 11/2004 | Niedermayr et al. | |
| 6,868,920 B2 | 3/2005 | Hoteit et al. | |
| 8,121,971 B2 | 2/2012 | Edwards et al. | |
| 8,170,800 B2 | 5/2012 | Aamodt et al. | |
| 8,615,363 B2 | 12/2013 | Aamodt et al. | |
| 8,752,648 B2 | 6/2014 | Goebel et al. | |
| 9,396,295 B2 * | 7/2016 | Lahav | G06F 30/20 |
| 9,896,925 B2 * | 2/2018 | Hernandez | E21B 7/00 |
| 2004/0040746 A1 * | 3/2004 | Niedermayr | E21B 44/00 175/38 |
| 2005/0010382 A1 * | 1/2005 | Oliver | E21B 44/00 703/7 |
| 2005/0087367 A1 * | 4/2005 | Hutchinson | E21B 44/00 175/45 |
| 2007/0185696 A1 * | 8/2007 | Moran | G05B 13/027 703/10 |
| 2008/0181230 A1 * | 7/2008 | Hitt | H04L 67/125 370/395.1 |
| 2008/0208475 A1 * | 8/2008 | Karr | H04L 67/12 702/6 |
| 2008/0289877 A1 * | 11/2008 | Nikolakis-Mouchas | E21B 44/00 175/57 |
| 2009/0132458 A1 | 5/2009 | Edwards et al. | |
| 2010/0032165 A1 * | 2/2010 | Bailey | G06F 30/00 166/369 |
| 2010/0235101 A1 * | 9/2010 | Aamodt | G06N 5/022 702/9 |
| 2011/0174541 A1 * | 7/2011 | Strachan | E21B 44/00 175/27 |
| 2012/0123756 A1 * | 5/2012 | Wang | E21B 44/00 703/2 |
| 2013/0179136 A1 * | 7/2013 | Tiwari | E21B 41/00 703/10 |
| 2014/0067353 A1 * | 3/2014 | Shelley | E21B 43/26 703/10 |
| 2014/0116776 A1 * | 5/2014 | Marx | E21B 47/00 175/24 |
| 2014/0121972 A1 * | 5/2014 | Wessling | G01V 11/002 702/6 |
| 2014/0151121 A1 * | 6/2014 | Boone | E21B 44/02 175/27 |
| 2014/0277752 A1 * | 9/2014 | Chang | E21B 44/00 700/275 |
| 2014/0326449 A1 | 11/2014 | Samuel et al. | |
| 2015/0134257 A1 * | 5/2015 | Erge | E21B 44/00 702/9 |
| 2015/0153917 A1 * | 6/2015 | Lv | G06F 9/451 715/771 |
| 2015/0218914 A1 | 8/2015 | Marx et al. | |
| 2015/0300151 A1 | 10/2015 | Mohaghegh | |
| 2015/0315897 A1 | 11/2015 | Samuel et al. | |
| 2016/0239754 A1 | 8/2016 | Dursun et al. | |
| 2016/0245027 A1 * | 8/2016 | Gumus | E21B 21/08 |
| 2016/0252636 A1 * | 9/2016 | Berger, III | E21B 47/12 702/9 |
| 2017/0235284 A1 | 8/2017 | Watson | |
| 2018/0024000 A1 * | 1/2018 | Turner | G06F 17/18 175/45 |
| 2018/0025269 A1 * | 1/2018 | Dursun | E21B 44/04 175/24 |
| 2018/0238162 A1 * | 8/2018 | Jeffryes | E21B 44/02 |
| 2020/0056478 A1 * | 2/2020 | Lima | E21B 41/00 |

OTHER PUBLICATIONS

International Search Report and Written Opinion issued in International Application No. PCT/US2019/031423 dated Jul. 16, 2019, 17 pages.
"Salminen et al., ""IADC/SPE-178888-MS Stuck Pipe Prediction Using Automated Real-Time Modeling and Data Analysis,"" IADC/SPE Drilling Conference and Exhibition 2016, retrieved from URL <https://www.onepetro.org/downl oad/conference-paper/SPE-178888-MS?id=conference-paper/SPE-178888-MS>, retrieved on Aug. 24, 2016, available on or before Mar. 3, 2016, 20 pages".
Siruvuri et al., "Stuck Pipe Prediction and Avoidance: A Convolutional Neural Network Approach," SPE-98378-MS, presented at IADC/SPE Drilling Conference, Feb. 21-23, 2006, 6 pages.
Shadizadeh et al., "Drilling Stuck Pipe Prediction in Iranian Oil Fields: An Artifical Neural Network Approach," Iranian Journal of Chemical Engineering vol. 7, No. 4, Fall 2010, 13 pages.
Kucs et al., "Automated Real-Time Hookload and Torgue Monitoring," SPE-112565-MS, Society of Petroleum Engineers, presented at IADC/SPE Drilling Conference, Mar. 4-6, 2008, 14 pages.
Jardine et al., "An Advanced System for the Early Detection of Sticking Pipe," SPE/23915-MS, Society of Petroleum Engineers, SPE/IADC Drilling Conference, Feb. 18-21, 1992, 9 pages.
GCC Examination Report in GCC Appln. No. GC 2019-37556, dated Jun. 29, 2020, 4 pages.
GCC Examination Report in GCC Appln. No. GC 2019-37556, dated Nov. 19, 2020, 6 pages.
GCC Examination Report in GCC Appln. No. GC 2019-37556, dated Jun. 2, 2021, 4 pages.

* cited by examiner

DRILLING TROUBLE PREDICTION USING STAND-PIPE-PRESSURE REAL-TIME ESTIMATION

BACKGROUND

In the petroleum industry, stuck pipe is considered to be one of the most serious problems affecting wellbore stability. Usually, the stuck pipe problem occurs deep in a wellbore when the pipe is oriented horizontally, making access to, working with, and correcting the stuck pipe difficult. Each stuck pipe incident can sharply decrease petroleum drilling efficiency due to the large amount of resources (for example, manpower, equipment, money, and time) needed to correct the stuck pipe.

SUMMARY

The present disclosure describes drilling trouble prediction using stand pipe pressure real-time estimation.

In an implementation, raw, real-time drilling data is pulled from a centralized database for processing. The raw, real-time drilling data is re-formatted into a format required for processing by one or more predictive models. Real-time processing is performed with respect to one or more drilling parameters associated with the re-formatted data using the one or more predictive models to generate output data. The output data received from the one or more predictive models is re-formatted for storage in the centralized database. The reformatted output data is retrieved from the centralized database for analysis with respect to visualization, generating alerts, or generating recommendations.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a described real-time, upstream, monitoring/predictive methodology and associated computing system (for example, a Drilling Real-time Prediction Environment (DRPE)) uses artificial intelligence (AI) techniques to provide continuous monitoring/analysis of drilling operations and to proactively provide alerts and advisory/preventative/remedial data (for example, recommendations/assistance) to upstream drilling engineers or to computer systems (for example, a dynamic monitoring/control system interfaced with a drilling computer system and machinery) (or both drilling engineers and computer systems) before a stuck pipe or other wellbore instability issues have a chance to manifest or mature into serious drilling issues. Second, the provided alerts and recommendations/assistance can be used by upstream drilling personnel (for example, real-time operations center (RTOC) engineers, drilling engineers/rig foremen) or computer systems to mitigate or to avoid the stuck pipe or other wellbore instability issues. This enables upstream drilling personnel to identify drilling trouble much earlier than conventionally possible and provide a greater time-frame in which to act to attempt to mitigate/correct a predicted issue. Third, in some implementations, the DRPE can include one or more software tools (for example, a drilling operations simulator, plan adjustment/optimization while drilling, trouble prediction and mitigation system, and a real-time advisory system) to provide the previously-described data (for example, recommendations/assistance) and to enable or perform one or more preventative/remedial actions. Fourth, the described real-time system can also be used to maintain safety and to monitor drilling non-productive time (NPT)—two key factors in improving safety and drilling efficiency while minimizing problem costs associated with well construction and production operations. The provided data helps to prevent drilling operation hazards and to reduce drilling NPT, ensuring both safe and efficient upstream drilling operations.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
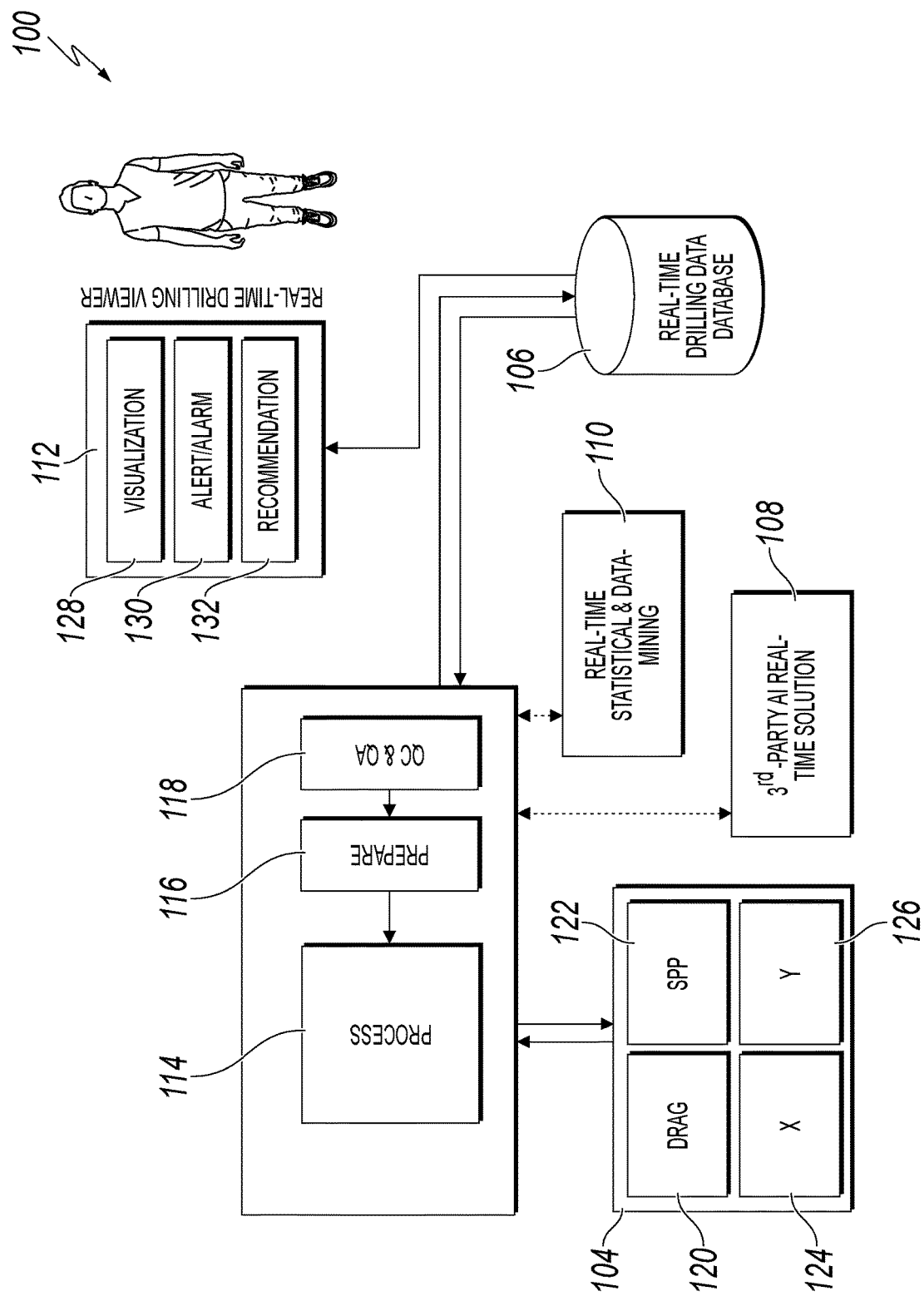
FIG. 1 is a block diagram of an example computing system architecture for describes drilling trouble prediction using stand pipe pressure (SPP) real-time estimation, according to an implementation of the present disclosure.

The following detailed description describes drilling trouble prediction using stand pipe pressure real-time estimation, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

The petroleum industry has a large effect on the global economy and is a leader in technology development and enhancement. The petroleum industry is usually divided into four major sectors forming a "value chain": 1) exploration; 2) upstream (or exploration and production); 3) midstream; and 4) downstream. Exploration covers initial seismic studies and drilling to explore oil reserves before developing the field and commencing production. Upstream includes searching for potential underground or underwater petroleum fields (for example, crude oil and natural gas), drilling exploratory wells, and subsequently drilling and operating the wells that recover and bring hydrocarbons to the surface. Upstream also includes all facilities (both, surface and subsurface) for production and preliminarily treatment and stabilization from the wellheads to the intersection with midstream. Midstream generally covers gas treatment processes, liquefied natural gas (LNG) operations, and oil/gas transportation pipelines between the upstream and downstream. Downstream mainly refers to refineries and storage facilities where oil, gas and condensates are processed to marketable products and then shipped to end users. The focus of this disclosure is on real-time predictive techniques and technologies for prediction of drilling trouble (or diagnosis of signs of drilling trouble ahead-of-time) as well as providing a recommended preventive action(s) to mitigate any predicted drilling trouble. For example, drilling trouble can include one or more of:

Difficult trip, high/low drag,
Borehole instability problems,
Stuck pipe (mechanical or differential),
Hole cleaning issues,
Twist-off, and
Low rate-of-production (ROP).

A drillpipe (or "pipe") is considered stuck if, during drilling operations, it cannot be freed from the hole without damaging the pipe, and without exceeding a drilling rig's maximum allowed hook load. Pipe sticking can be classified under two categories: 1) differential pressure pipe sticking (for example, drilling through depleted zones where pressure differentials cause a pipe to embed in a wellbore wall) and 2) mechanical pipe sticking (for example, keyseating, packoff from poor hole cleaning, shale swelling, plastic-flowing formation, and bridging). In the petroleum industry, stuck pipe is considered to be one of the most serious problems affecting wellbore stability and can account for nearly half of the total cost of a well. Stuck pipe can also be associated with well-control and lost-circulation events, both costly disruptions to drilling operations.

Usually, stuck pipe occurs in high-angle and horizontal wells deep in a wellbore, making access to, working with, and correction of the stuck pipe difficult. Each stuck pipe incident can sharply decrease petroleum drilling efficiency due to the large amount of resources (for example, manpower, equipment, money, and time) needed to correct the problem once it occurs. While real-time monitoring exists in some drilling systems to monitor drilling operations and to provide monitoring data, an increase in the overall number and complexity of drilling operations precludes monitoring of many wells with existing systems.

Described is a real-time, upstream, monitoring/predictive methodology and associated computing system (for example, a drilling real-time prediction environment (DRPE)) using artificial intelligence (AI) techniques to provide continuous monitoring/analysis of drilling operations and to proactively provide alerts and advisory/preventative/remedial data (for example, recommendations/assistance) to upstream drilling engineers or to computer systems (for example, a dynamic monitoring/control system interfaced with a drilling computer system and machinery) (or both drilling engineers and computer systems) before a stuck pipe or other wellbore instability issues have a chance to manifest or mature into serious drilling issues. The real-time system can be configured to self-interoperate real-time drilling data and other data to calculate and to predict normal values for one or more drilling parameters; in addition to highlighting the abnormal operational behavior in advance. In some implementations, the real-time system can be configured to indicate abnormal operational behavior/wellbore instability by correlating only mud flow-in against stand pipe pressure (SPP) in a particular time window and without historical data. As a result, the real-time system's identification of abnormal behavior/wellbore instability is more focused/faster and requires fewer parameters than conventional technologies for identification and alert generation.

The provided alerts and recommendations/assistance can be used by upstream drilling personnel (for example, real-time operations center (RTOC) engineers, drilling engineers/rig foremen) or computer systems to mitigate or to avoid the stuck pipe or other wellbore instability issues. This enables upstream drilling personnel to identify drilling trouble much earlier than conventionally possible and provide a greater time-frame in which to act to attempt to mitigate/correct a predicted issue. In some implementations, the DRPE can include one or more software tools (for example, a drilling operations simulator, plan adjustment/optimization while drilling, trouble prediction and mitigation system, and a real-time advisory system) to provide the previously-described data (for example, recommendations/assistance) and to enable or perform one or more preventative/remedial actions.

The described real-time system can also be used to maintain safety and to monitor drilling non-productive time (NPT)—two key factors in improving safety and drilling efficiency while minimizing problem costs associated with well construction and production operations. The provided data helps to prevent drilling operation hazards and to reduce drilling NPT, ensuring both safe and efficient upstream drilling operations.

Despite the need to understand the conditions which create drilling operation risks (such as, wellbore instabilities), there is no industry consensus regarding which wellbore stability analysis methodologies are most applicable under varying geologic conditions. Therefore, conventional industry is forced, unnecessarily, to rely on inefficient manual, real-time data interpretation and human intervention. Manual, real-time data interpretation and human intervention is simply too erroneous and inefficient, and cannot technically be performed within a timeframe necessary to provide the described proactive alerts and recommendations of the described real-time system and to act on the provided data to mitigate identified issues before maturation into serious drilling situations. There is no human-centered analogue/activity that can provide the described benefits generated by the real-time system.

In some implementation, the described real-time system leverages AI techniques including one or more predictive models used to predict key drilling parameter values (for example, stand pipe pressure (SPP), mud flow-in, and bit depth) in real time. In some implementations, the predictive models will use a decision tree concept to identify if one or more parameter values remain constant (for example, mud flow-in values) and move to higher-level of analysis, by analyzing trends (that is, trend analysis) of one or more drilling parameter (for example, SPP) value trends. In an instance, real-time drilling data points (for example, 50,000/ second (s)) are processed for both mud flow-in and SPP, and new active data-points values are compared with previously-received data point values.

As a particular example, drilling SPP parameter values can be predicted in real-time using an AI engine and the one or more predictive models for the SPP parameter value. SPP indicates drilling fluid pressure within a drilling string. The importance of SPP is that it can provide an indication about the drilling string, bottom-hole assembly (BHA), and wellbore status. The SPP parameter is highly correlated with mud flow-in, and SPP parameter values alternate (either up or down) infrequently. As a result, detecting a change in SPP parameter values (that is, an "abnormality") requires precision, unless a major change in the drilling operation takes-place. In the case of a major change in the drilling operation, the SPP parameter value can change frequently. By considering mud flow-in in a constant state, if the SPP parameter value increases, this can indicate, for example, a plug in a bit nozzle, early indication of a pack-off in the drilling string, or a hole-cleaning issue. If the SPP parameter value decreases, this can indicate, for example, a washout in the BHA or in the hole. The SPP parameter value can also be monitored while drilling or tripping-out.

In typical implementations and at a high-level, the described real-time system:
1. Receives real-time drilling data,
2. Monitors mud flow-in and SPP parameters,
3. Identifies time intervals where mud flow-in is constant (if flow-in is constant, then the SPP must be constant under normal conditions) within a fluctuation of 10% for at least ten time interval points,
4. For the constant situation, the SPP model takes the upper ⅓ of SPP values, then processes the values to obtain a trend value. For constant mud flow-in, the ⅓ of a particular time interval is identified and then, for the particular time interval, the average SPP values are calculated and extrapolated for the remaining ⅔ of the particular time interval. The trend value is extended to the entire identified interval as "calculated SPP,"
5. If the actual SPP values correspond to the calculated SPP values, the situation is considered normal.
6. The moment the actual SPP values start to increase or decrease, the situation is considered to be an abnormality, and the SPP model will generate an alarm to indicate possible early-stage drilling trouble. Because the mud flow-in is constant, the average top ⅓ of the SPP is used for comparison purposes.

Using the SPP model, the real-time system can self-interpret the well profile in real-time, and identify normal SPP values in real-time. The SPP model can highlight identified slight deviations (that is, an abnormality) in SPP values based upon a static- or dynamically-defined threshold, where the deviations can be interpreted, for example, as early signs of a stuck-pipe, washout, pack-off, or drilling string failure. The identified abnormality can be used by the real-time system to generate, for example, the previously-mentioned proactive alerts and recommendations with respect to possible drilling trouble.

In some implementations, predictive models can be trained either using offset well data or real-time operational data (or a combination of both) for further advanced drilling trouble predication. Testing indicated a high true-positive rate of 80%-90%.

FIG. 1 is a block diagram of an example computing system architecture 100 for describes drilling trouble prediction using stand pipe pressure real-time estimation, according to an implementation of the present disclosure. In the illustrated example, architecture 100 includes the Processor 102, Models 104, Real-time Drilling Data Database 106, $3^{rd}$-party AI Real-time Solution 108, Real-time Statistical & Data-mining 110, and Real-time Drilling Viewer 112.

The Processor 102 includes a Process 114, data preparation and format/re-format utility 116 (Prepare), and a function for Quality Control (QC)/Quality Analysis (QA) 118. The Process 102 can be considered as the master controller of all functions related to the architecture 100. In some implementations, the Processor 114 handles, for example, control, maintenance, scheduling, communication, and clean-up with respect to the architecture 100.

Data (for example, real-time drilling or other data) can be received by the Processor 102 from the Real-time Drilling Data Database 106. In some implementations, received data includes time, mud flow-in, and SPP. In some implementations, the Real-time Drilling Data Database 106 is a real-time drilling data database configured to store data in standard Wellsite Information Transfer Standard Markup Language (WITSML) format or other formats. WITSML was developed by and is maintained by ENERGISTICS of Houston, Tex., USA, a global, non-profit, industry consortium that facilitates an inclusive user community for the development, adoption and maintenance of collaborative, open standards for the energy industry in general and specifically for oil and gas exploration and production. As will be appreciated by those of ordinary skill in the art, receipt of data by the Processor 102 can include data that is either pulled from the Real-time Drilling Data Database 106 or received by instructing the Real-time Drilling Data Database 106 to push the data to the Processor 102.

The Process 114 can be used to trigger the QC & QA 118 with respect to the received data. In some implementations, the QC & QA 118 function can be used, for example, to normalize, verify, remove, or correct the received data based on logic leveraging, for example, rules, data, or trend analysis to determine the quality of the received data. The QC & QA 118 function can also be used to remove noise from the received drilling data.

Prepare 116 can be used to prepare and format/re-format the QC/QA'd data from one format to another for use by the Models 104. For example, the received data in WITSML format can be re-formatted to comma-separated values (CSV) or other formats for processing by the Models 104.

The Processor 102 pushes the re-formatted data to one or more Models 104 for processing. The Processor 102 can push the re-formatted data to one or more of the Models 104 based on (for example, the type of data) for processing. In some implementations, the processing by the Models 104 is performed in real-time. In some implementation, processing by one or more Models 104 is performed in conjunction with the 3$^{rd}$-party Real-time Solution 108, the Real-time Statistical & Data-mining 110, the Real-time Drilling Data Database 106, or a combination of these.

The Models 104 return data once processing is complete. In some implementations, the returned data includes: 1) calculated SPP values and 2) predicted SPP values. If the calculated SPP values and predicted SPP values do not correspond, this can be an indication of potential drilling trouble.

In some implementations, data returned by the Models 104 (that is, one or more analytical results) can be post-processed by the Processor 102 (for example, by Process 114, Prepare 116, or QC & QA 118) prior to use by other components of the architecture 100 (for example, the Real-time Drilling Data Database 106, 3$^{rd}$-party AI Real-time Solution 108, Real-time Statistical & Data-mining 110, and Real-time Drilling Viewer 112). In some implementations, the data returned by the Models 104 is converted back into WITSML (for example, from CSV) and stored into the Real-time Drilling Data Database 106 for access by other elements of the architecture 100. The Real-time Drilling Data Database 106 stores both raw, real-time drilling data and the one or more associated analytical results. This data can be used by one or more elements of the architecture 100 (for example, analysis, visualization, proactive alert/alarm generation, or proactive recommendation of preventative/remedial actions to mitigate/correct an identified issue.

Models 104 can be considered to be the brain of the architecture 100. Models 104 include different AI-based models (one or more sets of algorithms/equations that process input and generate output) for processing the received data and generating predictive and analytical results. For example, illustrated models in Models 104 include Drag 120, SPP 122, X 124, and Y 126. The Drag 120 model is used to predict a stuck pipe. In some implementations, one or more of the Models 104 can be developed using MATLAB, a proprietary multi-paradigm numerical computing environment by MATHWORKS of Natick, Mass., USA. In these and other implementations, other types of models developed with other technologies that can be interfaced with architecture 100 can be used (for example, knowing data input/output formats and a command interface for a particular model). In some implementations, various models in Models 104 can form a library of available functionality that can be leveraged by the Processor 102 or other elements of architecture 100.

In some implementations, architecture 100 can be integrated with a 3$^{rd}$-party AI Real-time Solution 108, which can be used to perform some of all of the functionality provided by the Models 104. For the purposes of this disclosure, the example computing system architecture 100 can be considered to be an "AI Engine" that extracts data from a database repository (for example, the Real-time Drilling Data Database 106) in real-time, reformats it, and based on a need, passes the extracted data to a proper AI model (for example, Models 104), or even a 3$^{rd}$ party solution (for example, a 3$^{rd}$ party AI Real-time Solution 108). The AI Engine waits for a response and then inserts the response into the database repository in a proper format. In some implementations, both Models 104 and the 3$^{rd}$-party AI Real-time Solution 108 can be used in conjunction with each other to provided individual or collaborative data processing/analysis solutions. In some implementations, one or the other of the Models 104 and the 3$^{rd}$-party AI Real-time Solution 108 can be used to initially process data and then to pass output data to the other element for further processing, leveraging the strength(s) of each individual element in the architecture 100.

In some implementations, Real-time Drilling Data Database 106 can be part of a real-time drilling data stream or a separate real-time drilling data stream (not illustrated) can be interfaced with the architecture 100. In this manner, architecture 100 can be configured to flexibly-process, in real-time, different data streams (for example, different drilling systems of a common petroleum reservoir), integrate data, and perform advanced analytics capabilities using one or more software processing solutions (for example, Models 104, 3$^{rd}$-party AI Real-time Solution 108, and Real-time Statistical & Data-mining 110). As will be appreciated by those of ordinary skill in the art, software processing solutions, other than those illustrated and consistent with this disclosure, can be configured to work with one or more elements of architecture 100.

Real-time Statistical & Data-mining 110 can be used to mine Model 104 output data or raw, real-time drilling data to perform statistical correlations and mine data for interesting/useful connections. The Real-time Statistical & Data-mining 110 element can be queried by the Processor 102 to provide data used by the Processor 102 to generate (using, for example, the Real-time Drilling Viewer 112) visualizations, proactive alerts/alarms, or proactive recommendations of preventative/remedial actions to mitigate/correct an identified issue.

The Real-time Drilling Viewer 112 includes components for Visualization 128, Alert/Alarm 130, and Recommendation 132. In some implementations, the Real-time Drilling Viewer 112 can be one or more software applications executing on a client computing device (for example, a smart phone, tablet-type computer, laptop-type computer, or a desktop computer). The Real-time Drilling Viewer 112 is configured to permit a user to view real-time drilling (and other) data (for example, predictive and analytical results) with respect to both raw/analyzed real-time drilling data) and to generate one or more visualizations, alerts/alarms, or recommendations based on the analysis of the real-time drilling (and other) data. For example, a user can use the Real-time Drilling Viewer 112 to query the Real-time Drilling Data Database 106 or other element of architecture 100 for data related to received and analyzed real-time drilling data. In some implementations, the Real-time Drilling Viewer 112 also permits the user to interact with one or more graphical user interfaces (GUIs), which can generate and send one or more requests (for example, for additional data), commands (for example, to stop, slow, or redirect a petroleum drill or related equipment), or messages (for example, to another user or computer system).

Pilot Findings

In an implementation, the described real-time methodology and associated computing system was initially tested with an SPP model (for example, model SPP 122 of FIG. 1) using historical drilling data deployed into a production test to analyze actual operational drilling data on a real-time basis. Well types included exploration, evaluation, delineation, producer, and water injector. The SPP model was able to accurately identify and highlight, in advance, indicators of stuck-pipe, washout, and pack-off. The following details examples of the identification provided by the described real-time system using the SPP model.

Figure 2:
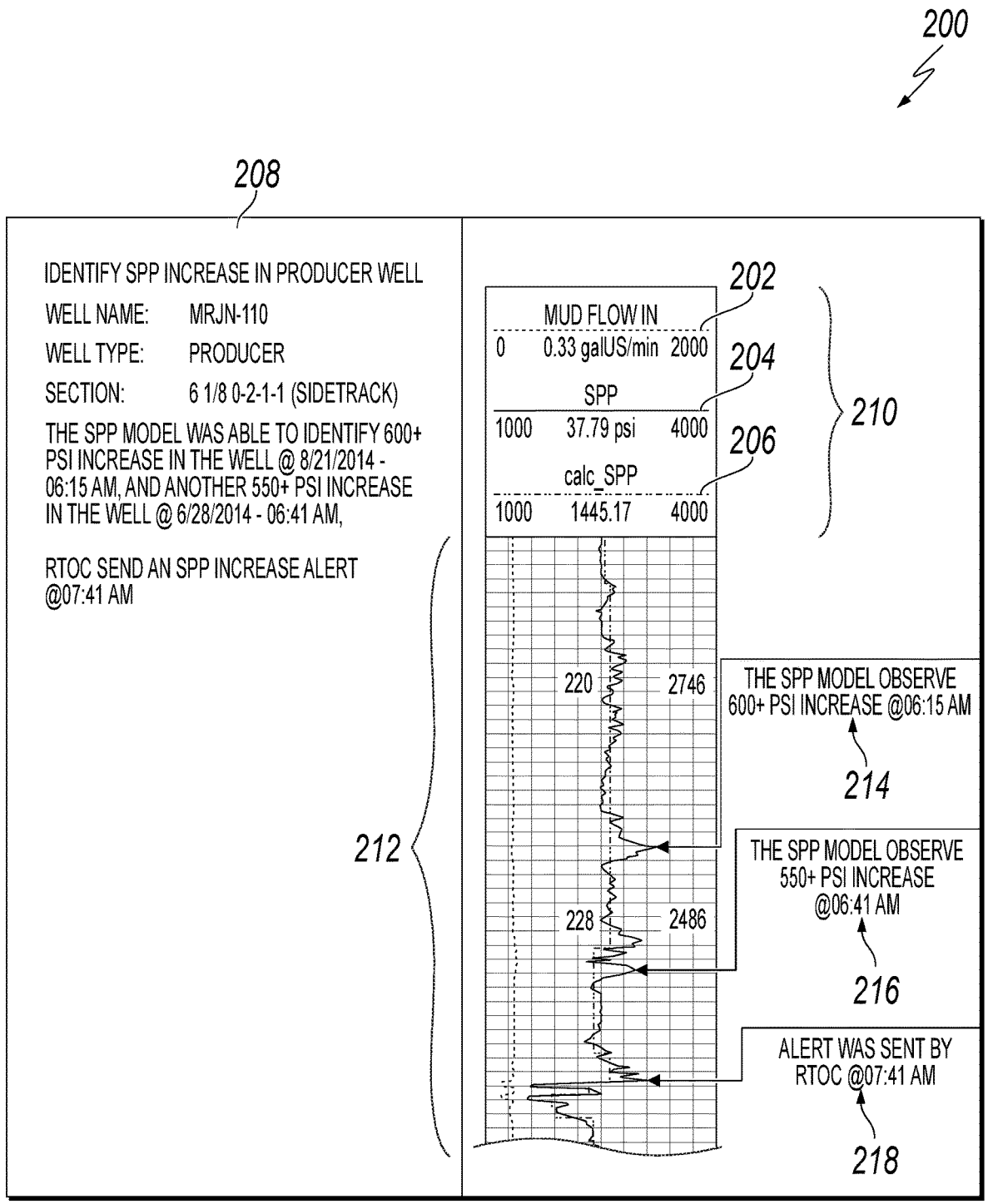
FIG. 2 is a graph illustrating an example visualization of identified increases in SPP and a corresponding alert generation, according to an implementation of the present disclosure.

FIG. 2 is a graph illustrating an example visualization 200 of identified increases in SPP and a corresponding alert generation, according to an implementation of the present disclosure. In the provided examples in FIGS. 2-6, line 202 represents mud-flow-in, line 204 represents the actual SPP parameter value, and the dashed line 206 represents the calculated SPP parameter value. Here, if the dashed line 206 and the line 204 are not in same track, this indicates an abnormality in the SPP behavior. For example, as illustrated in FIG. 2 (and, analogously, in FIGS. 3-6), visualization 200 includes an informational area 208, monitored parameters/values 210, and graphed values 212. Note that identified data and alerts are identified in FIGS. 2-6 with arrows that are typically not present in the described visualizations, but are included for help with understanding. In some implementations, the described visualizations of FIGS. 2-6 can highlight, augment, or otherwise draw attention to particular data values (for example, increases or decreases of monitored parameter values and generated alerts).

In FIG. 2, the SPP model has identified one or more SPP increases in a producer well (for example, at 214 and 216). As a result, an SPP increase alert 218 was sent by the monitoring RTOC.

Figure 3:
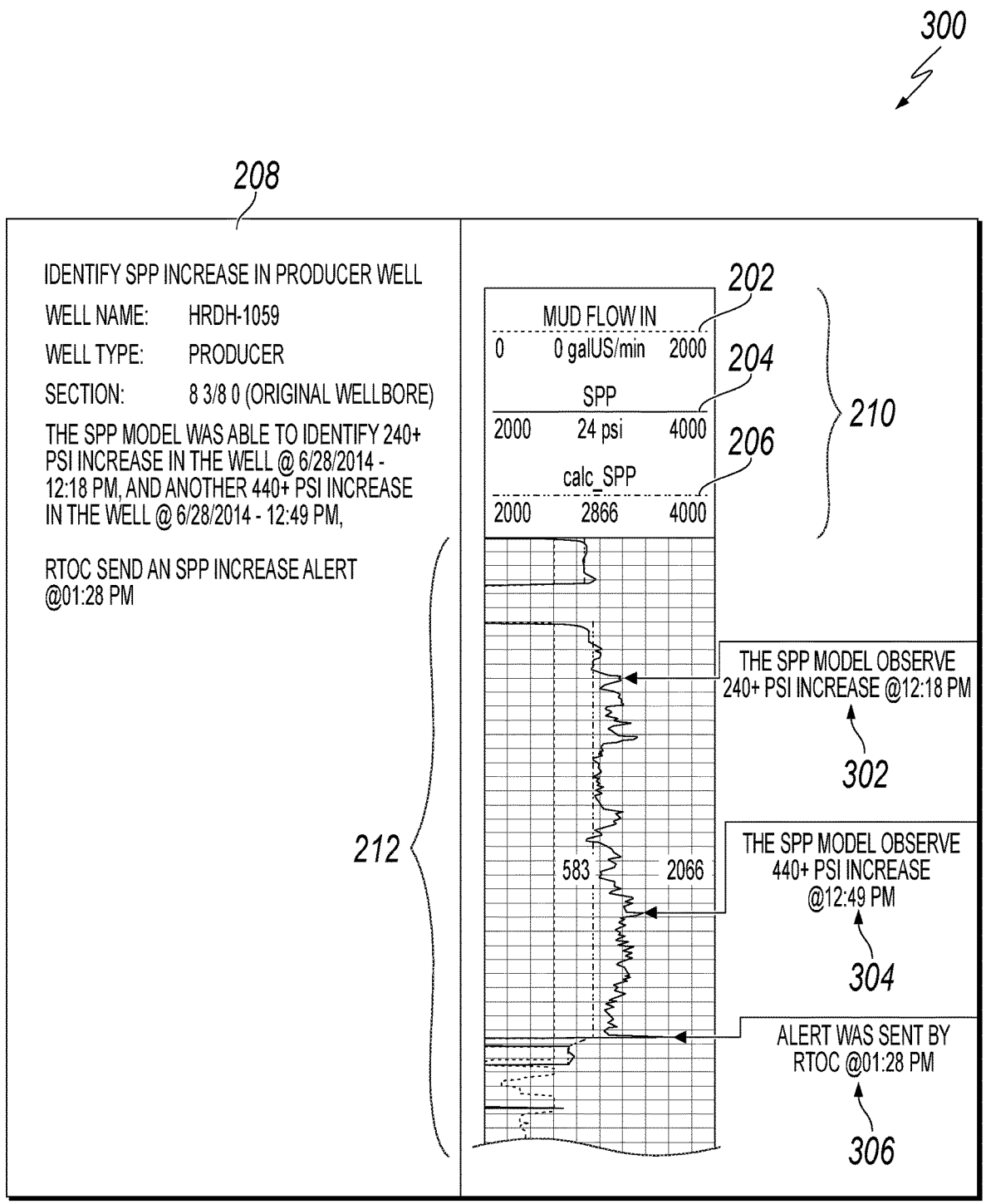
FIG. 3 is a graph illustrating an example visualization of identified increases in SPP and a corresponding alert generation, according to an implementation of the present disclosure.

FIG. 3 is a graph illustrating an example visualization 300 of identified increases in SPP and a corresponding alert generation, according to an implementation of the present disclosure. In FIG. 3, the SPP model has identified one or more SPP increases in a producer well (for example, at 302 and 304). As a result, an SPP increase alert 306 was sent by the monitoring RTOC.

Figure 4:
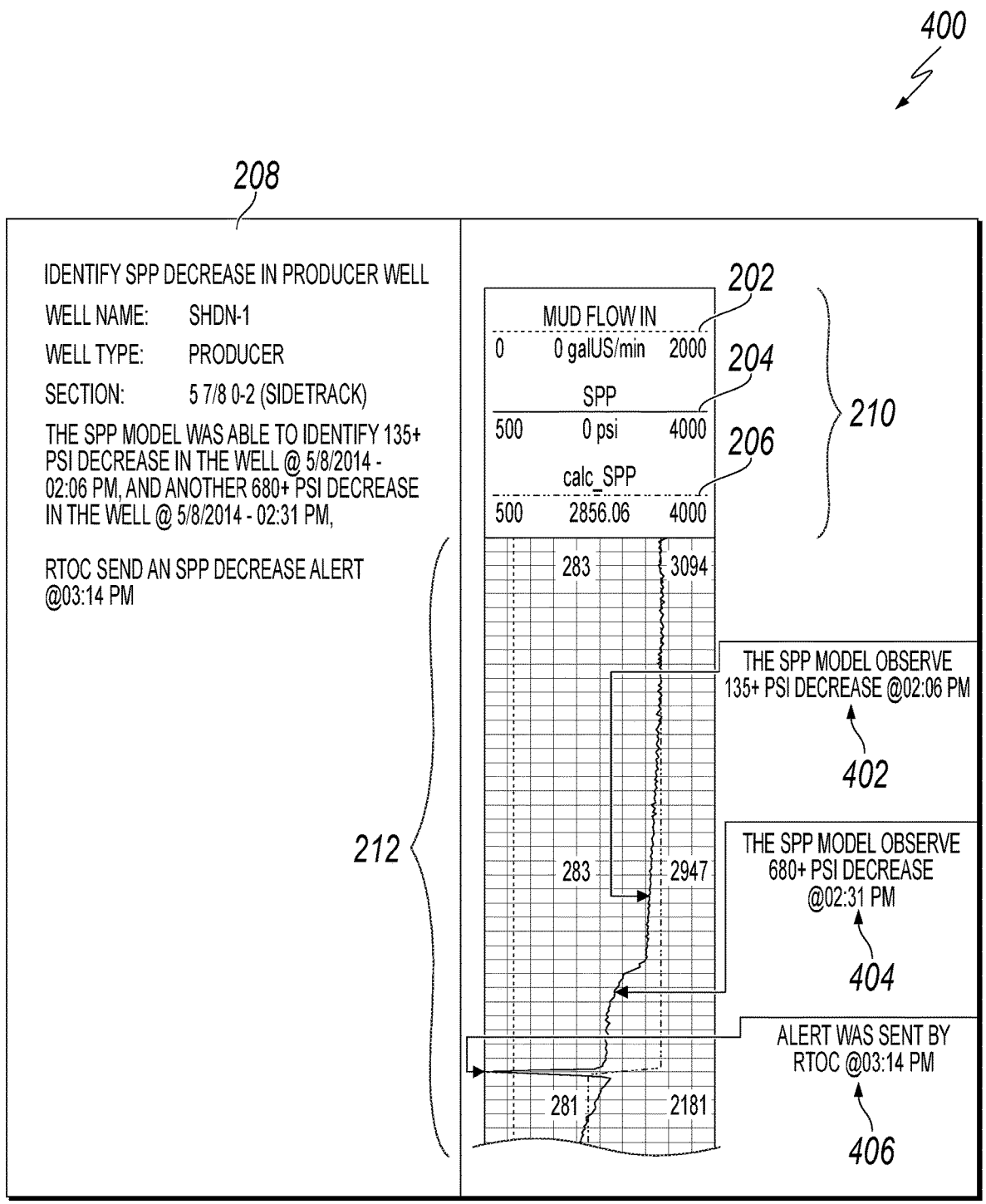
FIG. 4 is a graph illustrating an example visualization of identified decreases in SPP and a corresponding alert generation, according to an implementation of the present disclosure.

FIG. 4 is a graph illustrating an example visualization 400 of identified decreases in SPP and a corresponding alert generation, according to an implementation of the present disclosure. In FIG. 4, the SPP model has identified one or more SPP decreases in a producer well (for example, at 402 and 404). As a result, an SPP decrease alert 406 was sent by the monitoring RTOC, as indicated at 406.

Figure 5:
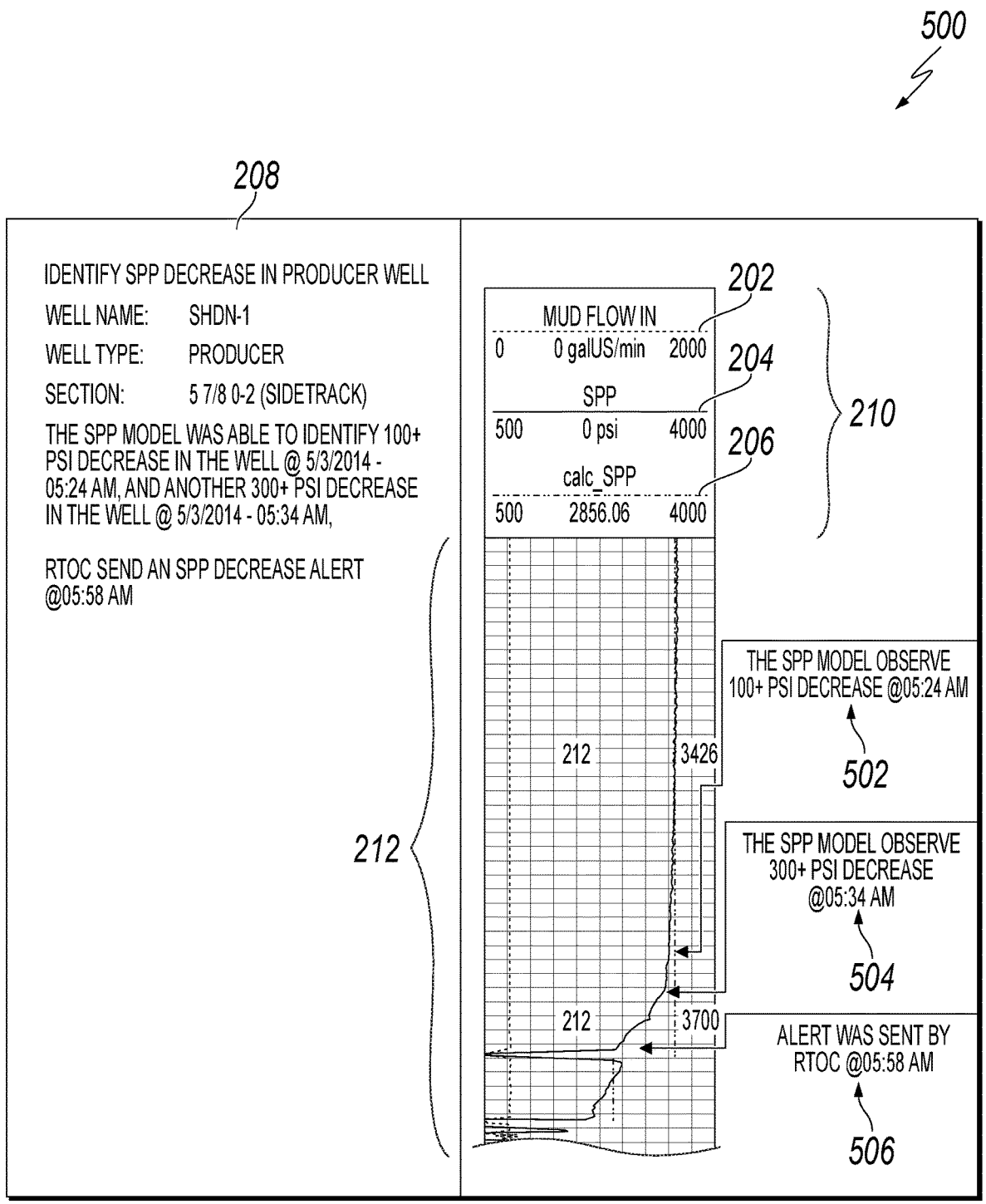
FIG. 5 is a graph illustrating an example visualization of identified decreases in SPP and a corresponding alert generation, according to an implementation of the present disclosure.

FIG. 5 is a graph illustrating an example visualization 500 of identified decreases in SPP and a corresponding alert generation, according to an implementation of the present disclosure. In FIG. 5, the SPP model has identified one or more SPP decreases in a producer well (for example, at 502 and 504). As a result, an SPP decrease alert 506 was sent by the monitoring RTOC.

Figure 6:
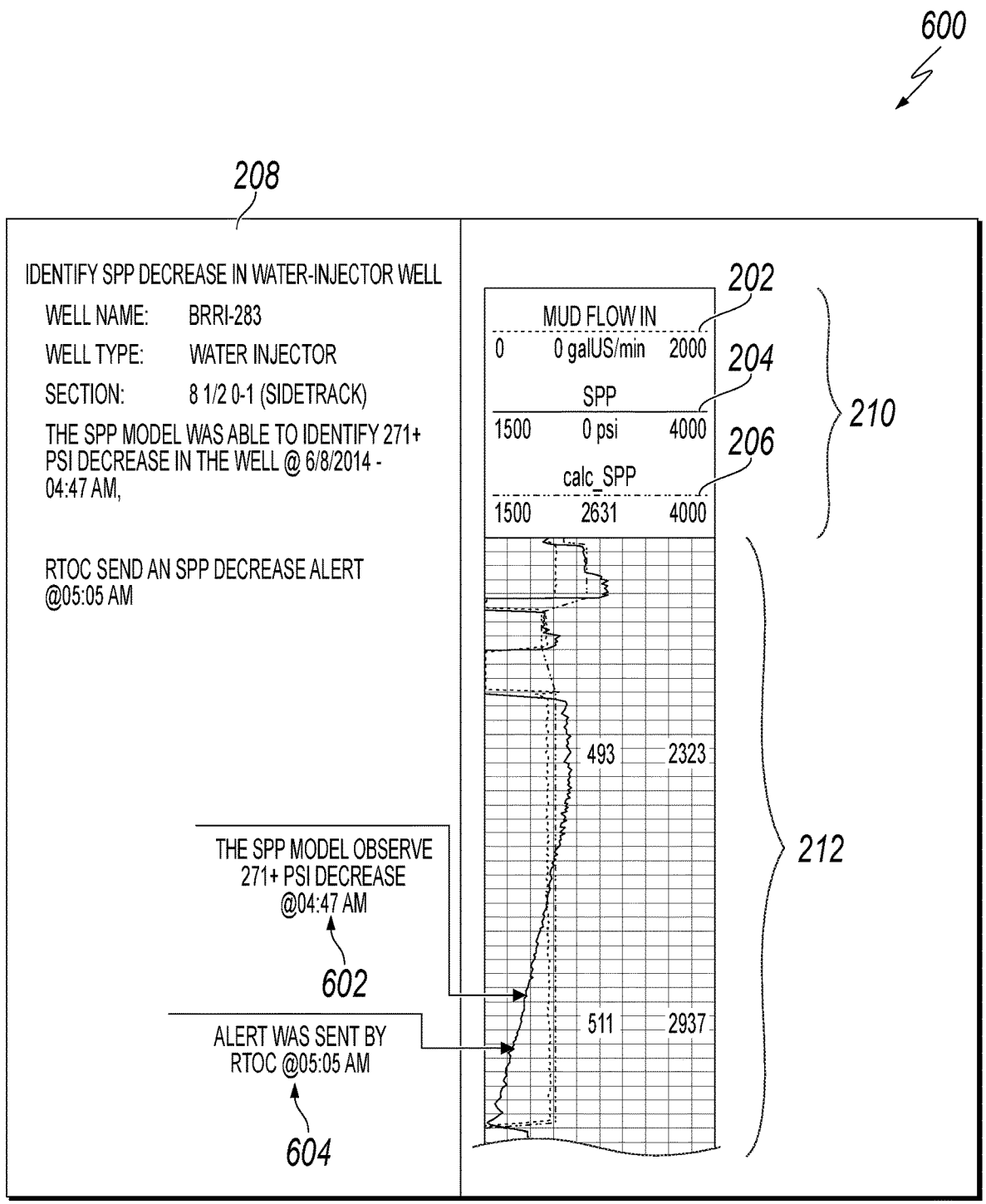
FIG. 6 is a graph illustrating an example visualization of identified decreases in SPP and a corresponding alert generation, according to an implementation of the present disclosure.

FIG. 6 is a graph illustrating an example visualization 600 of identified decreases in SPP and a corresponding alert generation, according to an implementation of the present disclosure. In FIG. 6, the SPP model has identified one or more SPP decreases in a Water-injector well (for example, at 602). As a result, an SPP decrease alert 604 was sent by the monitoring RTOC.

Figure 7:
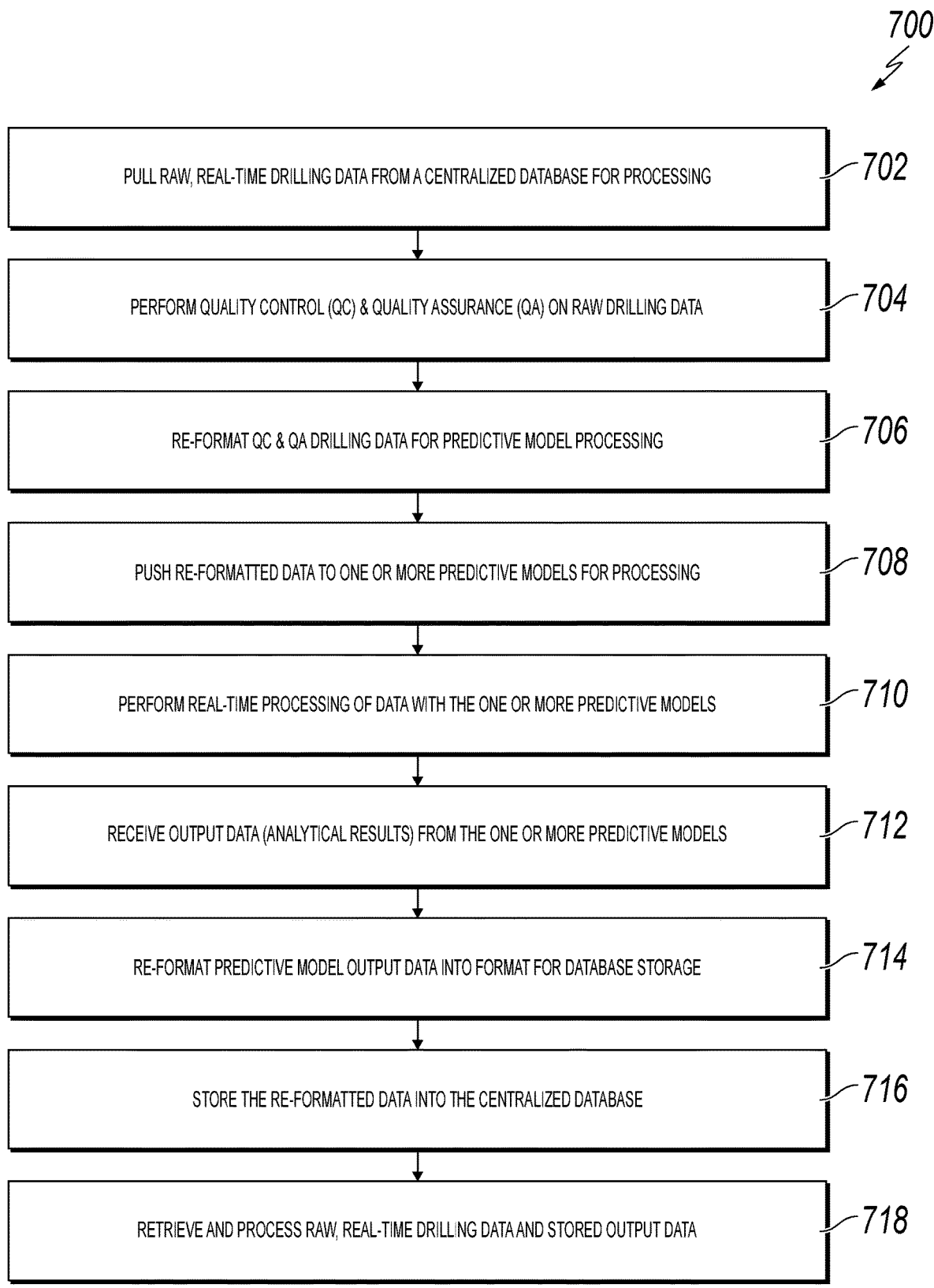
FIG. 7 is a flowchart illustrating an example of a computer-implemented method for drilling trouble prediction using SPP real-time estimation, according to an implementation of the present disclosure.

FIG. 7 is a flowchart illustrating an example of a computer-implemented method 700 for drilling trouble prediction using SPP real-time estimation, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, the described real-time system (for example, a centralized database used as a buffer/cache for raw, real-time drilling data) is integrated with a real-time drilling operation data source (for example, a drilling rig and controlling computers/sensors) to process real-time drilling data parameter values (for example, time, mud flow-in, SPP, and bit depth). Raw, real-time drilling data is pulled from the centralized database for processing. Note that alerts can only be properly generated if drilling data parameters to be compared (for example, mud flow-in, SPP, and bit depth) are each recorded in real-time. From 702, method 700 proceeds to 704.

At 704, the raw, real-time drilling data undergoes QC & QA to ensure data quality for processing by one or more predictive models. In some implementations, the real-time drilling data undergoes QC & QA to remove noise. From 704, method 700 proceeds to 706.

At 706, the QC & QA data is re-formatted for processing by the one or more predictive models. For example, the QC & QA data can be re-formatted from a WITSML format into a CSV format. From 706, method 700 proceeds to 708.

At 708, the re-formatted data is pushed to the one or more predictive models for processing. In some implementations, the Processor or other element of the described real-time system can perform processing to determine which predictive model(s) will be used to process the re-formatted data. From 708, method 700 proceeds to 710.

At 710, real-time processing is performed on the re-formatted data using the one or more predictive model(s). The one or more predictive models extract and process parameters (for example, time, SPP, bit depth, and mud-flow-in) associated with the re-formatted data. In some implementations, the one or more predictive models can perform the following:
1. Analyze and classify the data (for example, as associated with drilling or tripping operations),
2. Perform trend-based analysis on the data,
3. Obtain calculated and predicted values for the data parameters, and
4. Push the calculated and predicted values for the data parameters back to the centralized real-time drilling database.

Once the real-time processing is complete, output data (that is, analytical results) from the one or more predictive models is pushed to the Processor. From 710, method 700 proceeds to 712.

At 712, the output data is received by the Processor. From 712, method 700 proceeds to 714.

At 714, the received output data is re-formatted into a format for database storage. For example, the received output data can be re-formatted from the CSV format back into the WITSML format. From 714, method 700 proceeds to 716.

At 716, the re-formatted data is stored into the database. From 716, method 700 proceeds to 718.

At 718, the stored output data and raw, real-time drilling data is retrieved from the database and processed. For example, a Real-time Drilling Viewer or other software tool, utility, or application can be used to generate visualizations, alerts/alarms, or recommendations.

In some implementations, the Real-time Drilling Viewer can be used to display the real-time data associated with the values calculated and predicted by the one or more models. For example, if actual SPP values match model-calculated SPP values, then the operation is considered to be normal. However, if the actual SPP values do not match model-calculated SPP values, then an alert is generated to notify that the operation is abnormal (for example, trending toward a having a potential stuck pipe, washout, pack-off, mud weight change, or a hole-cleaning issue).

In some implementations, if an alert is generated, operation monitoring personnel (for example, a drilling rig foreman/drilling engineer or monitoring computer system) would pay attention to the particular well's operation, check operational records, and review the generated alert. If the parameter readings were expected, the alert can be discarded. Otherwise, the alert can be considered to be a true alert requiring remedial action. After 718, method 700 stops.

Figure 8:
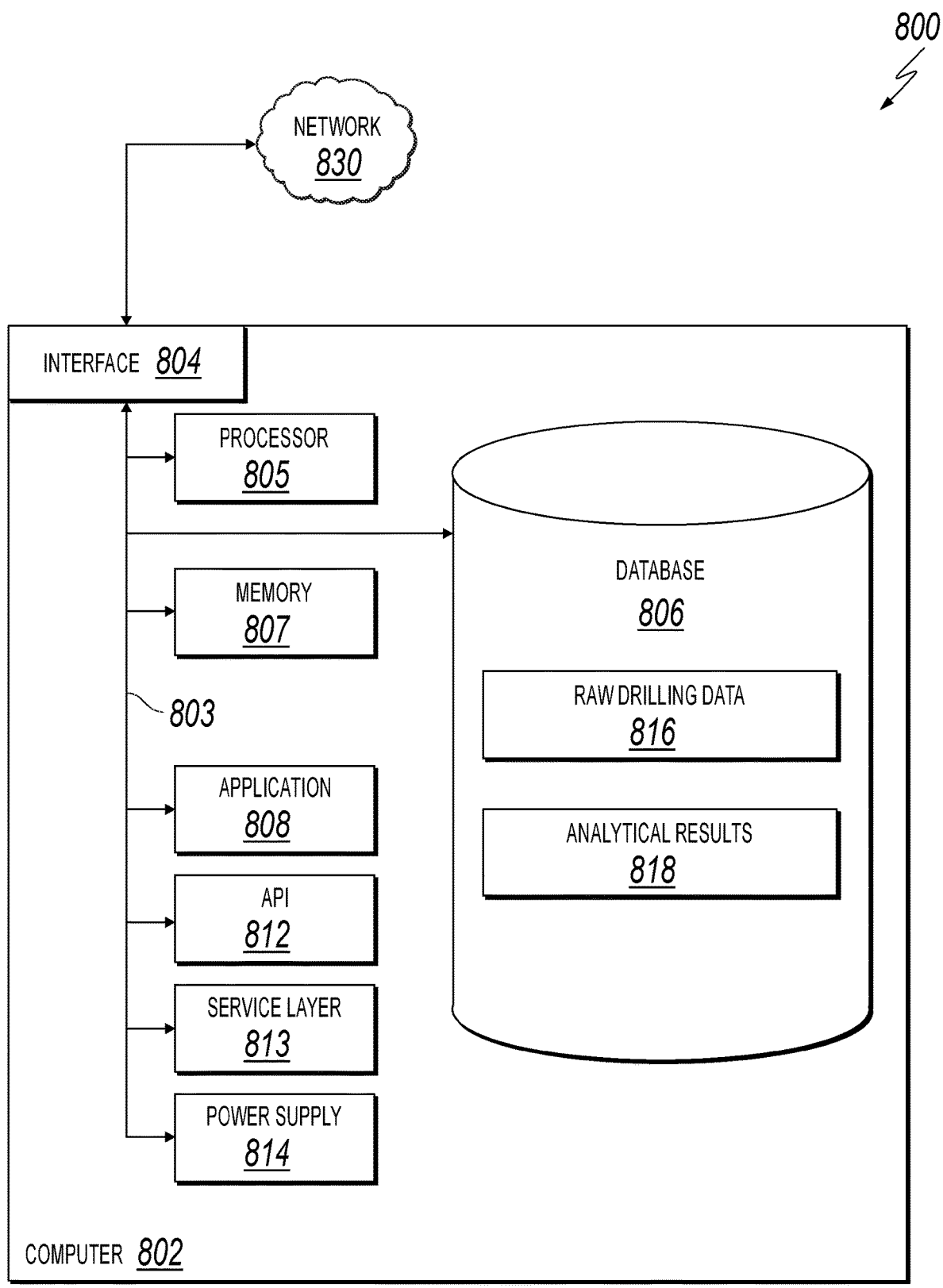
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented System 800 used to provide computational functionalities associated with described algorithms, methods, functions, processes, flows, and procedures, according to an implementation of the present disclosure. In the illustrated implementation, System 800 includes a Computer 802 and a Network 830.

The illustrated Computer 802 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 802 can include an input device, such as a keypad, keyboard, or touch screen, or a combination of input devices that can accept user information, and an output device that conveys information associated with the operation of the Computer 802, such as digital data, visual, audio, or a combination of types of information, on a graphical-type user interface (UI) (or GUI) or other UI. For example, in some implementations, the illustrated output images (such as, FIGS. 2-6) or other GUIs (not illustrated) associated with the illustrated output images (or other functionality consistent with this disclosure) can be interactive in nature and permit user actions to be performed (such as, triggering messages or requests for data to change, modify, or enhance the output images or to perform actions based on displayed data).

The Computer 802 can serve in a role in a distributed computing system as, for example, a client, network component, a server, or a database or another persistency, or a combination of roles for performing the subject matter described in the present disclosure. The illustrated Computer 802 is communicably coupled with a Network 830. In some implementations, one or more components of the Computer 802 can be configured to operate within an environment, or a combination of environments, including cloud-computing-based, local, or global.

At a high level, the Computer 802 is an electronic computing device operable to receive, transmit, process, store, or manage data and information associated with the described subject matter. According to some implementations, the Computer 802 can also include or be communicably coupled with a server, such as an application server, e-mail server, web server, caching server, or streaming data server, or a combination of servers.

The Computer 802 can receive requests over Network 830 (for example, from a client software application executing on another Computer 802) and respond to the received requests by processing the received requests using a software application or a combination of software applications. In addition, requests can also be sent to the Computer 802 from internal users (for example, from a command console or by another internal access method), external or third-parties, or other entities, individuals, systems, or computers.

Each of the components of the Computer 802 can communicate using a System Bus 803. In some implementations, any or all of the components of the Computer 802, including hardware, software, or a combination of hardware and software, can interface over the System Bus 803 using an application programming interface (API) 812, a Service Layer 813, or a combination of the API 812 and Service Layer 813. The API 812 can include specifications for routines, data structures, and object classes. The API 812 can be either computer-language independent or dependent and refer to a complete interface, a single function, or even a set of APIs. The Service Layer 813 provides software services to the Computer 802 or other components (whether illustrated or not) that are communicably coupled to the Computer 802. The functionality of the Computer 802 can be accessible for all service consumers using the Service Layer 813. Software services, such as those provided by the Service Layer 813, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 802, alternative implementations can illustrate the API 812 or the Service Layer 813 as stand-alone components in relation to other components of the Computer 802 or other components (whether illustrated or not) that are communicably coupled to the Computer 802. Moreover, any or all parts of the API 812 or the Service Layer 813 can be implemented as a child or a sub-module of another software module, enterprise application, or hardware module without departing from the scope of the present disclosure.

The Computer 802 includes an Interface 804. Although illustrated as a single Interface 804, two or more Interfaces 804 can be used according to particular needs, desires, or particular implementations of the Computer 802. The Interface 804 is used by the Computer 802 for communicating with another computing system (whether illustrated or not) that is communicatively linked to the Network 830 in a distributed environment. Generally, the Interface 804 is operable to communicate with the Network 830 and includes logic encoded in software, hardware, or a combination of software and hardware. More specifically, the Interface 804 can include software supporting one or more communication protocols associated with communications such that the Network 830 or hardware of Interface 804 is operable to communicate physical signals within and outside of the illustrated Computer 802.

The Computer 802 includes a Processor 805. Although illustrated as a single Processor 805, two or more Processors 805 can be used according to particular needs, desires, or particular implementations of the Computer 802. Generally, the Processor 805 executes instructions and manipulates data to perform the operations of the Computer 802 and any algorithms, methods, functions, processes, flows, and procedures as described in the present disclosure.

The Computer 802 also includes a Database 806 that can hold data for the Computer 802, another component communicatively linked to the Network 830 (whether illustrated or not), or a combination of the Computer 802 and another component. For example, Database 806 can be an in-memory or conventional database storing data consistent with the present disclosure. In some implementations, Database 806 can be a combination of two or more different database types (for example, a hybrid in-memory and conventional database) according to particular needs, desires, or particular implementations of the Computer 802 and the described functionality. Although illustrated as a single Database 806, two or more databases of similar or differing types can be used according to particular needs, desires, or particular implementations of the Computer 802 and the described functionality. While Database 806 is illustrated as an integral component of the Computer 802, in alternative implementations, Database 806 can be external to the Computer 802. As illustrated, the Database 806 holds the previously described Raw Drilling Data 816 and Analytical Results 818.

The Computer 802 also includes a Memory 807 that can hold data for the Computer 802, another component or components communicatively linked to the Network 830 (whether illustrated or not), or a combination of the Computer 802 and another component. Memory 807 can store any data consistent with the present disclosure. In some implementations, Memory 807 can be a combination of two or more different types of memory (for example, a combination of semiconductor and magnetic storage) according to particular needs, desires, or particular implementations of the Computer 802 and the described functionality. Although illustrated as a single Memory 807, two or more Memories 807 or similar or differing types can be used according to particular needs, desires, or particular implementations of the Computer 802 and the described functionality. While Memory 807 is illustrated as an integral component of the Computer 802, in alternative implementations, Memory 807 can be external to the Computer 802.

The Application 808 is an algorithmic software engine providing functionality according to particular needs, desires, or particular implementations of the Computer 802, particularly with respect to functionality described in the present disclosure. For example, Application 808 can serve as one or more components, modules, or applications. Further, although illustrated as a single Application 808, the Application 808 can be implemented as multiple Applications 808 on the Computer 802. In addition, although illustrated as integral to the Computer 802, in alternative implementations, the Application 808 can be external to the Computer 802.

The Computer 802 can also include a Power Supply 814. The Power Supply 814 can include a rechargeable or non-rechargeable battery that can be configured to be either user- or non-user-replaceable. In some implementations, the Power Supply 814 can include power-conversion or management circuits (including recharging, standby, or another power management functionality). In some implementations, the Power Supply 814 can include a power plug to allow the Computer 802 to be plugged into a wall socket or another power source to, for example, power the Computer 802 or to recharge a rechargeable battery.

There can be any number of Computers 802 associated with, or external to, a computer system containing Computer 802, each Computer 802 communicating over Network 830. Further, the term "client," "user," or other appropriate terminology can be used interchangeably, as appropriate, without departing from the scope of the present disclosure. Moreover, the present disclosure contemplates that many users can use one Computer 802, or that one user can use multiple computers 802.

In some implementations, the described real-time system can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically-influence, direct, control, influence, or manage tangible, real-world equipment related to petroleum production, analysis, and recovery or for other purposes consistent with this disclosure. For example, data relating to SPP data can be used to enhance the quality of produced 2D/3D seismic/structural images or for use in other analytical/predictive processes. As another example, results relating to SPP data can be used to operate autonomous drilling equipment or to monitor/control mud pumps, radial power monitors (RPMs), or other drilling rig sensors/equipment. In some implementations, result data can be used to modify a wellbore trajectory, increase/decrease speed of or stop/start a petroleum drill, activate/deactivate an alarm (such as, a visual, auditory, or voice alarm), or to affect refinery or pumping operations (for example, stop, restart, accelerate, or reduce). Other examples can include alerting geo-steering and directional drilling staff when underground obstacles or adverse wellbore/drillstring conditions have been detected (such as, with a visual, auditory, or voice alarm). In some implementations, the described methodology and real-time system can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented method, comprising: pulling raw, real-time drilling data from a centralized database for processing; re-formatting the raw, real-time drilling data into a format required for processing by one or more predictive models; performing real-time processing with respect to one or more drilling parameters associated with the re-formatted data using the one or more predictive models to generate output data; re-formatting the output data received from the one or more predictive models for storage in the centralized database; and retrieving the reformatted output data from the centralized database for analysis with respect to visualization, generating alerts, or generating recommendations.

The foregoing and other described implementations can each, optionally, include one or more of the following features:

A first feature, combinable with any of the following features, further comprising integrating the centralized database with a real-time drilling operation data source.

A second feature, combinable with any of the previous or following features, further comprising performing quality control (QC) and quality analysis (QA) on the raw, real-time drilling data.

A third feature, combinable with any of the previous or following features, wherein the QC and QA is performed to remove noise from the raw, real-time drilling data.

A fourth feature, combinable with any of the previous or following features, wherein the real-time drilling data is stored in a Wellsite Information Transfer Standard Markup Language (WITSML) format and re-formatted into a comma-separated value (CSV) format.

A fifth feature, combinable with any of the previous or following features, further comprising: analyzing and classifying the re-formatted data; performing trend-based analysis on the re-formatted data; obtaining calculated and predicted values for the one or more data parameters; and pushing the calculated and predicted values for the one or more data parameters to the centralized database.

A sixth feature, combinable with any of the previous or following features, wherein the received output data is reformatted from a comma-separated value (CSV) format into a Wellsite Information Transfer Standard Markup Language (WITSML) format.

In a second implementation, a non-transitory, computer-readable medium storing one or more instructions executable by a computer system to perform operations comprising: pulling raw, real-time drilling data from a centralized database for processing; re-formatting the raw, real-time drilling data into a format required for processing by one or more predictive models; performing real-time processing with respect to one or more drilling parameters associated with the re-formatted data using the one or more predictive models to generate output data; re-formatting the output data received from the one or more predictive models for storage in the centralized database; and retrieving the reformatted output data from the centralized database for analysis with respect to visualization, generating alerts, or generating recommendations.

The foregoing and other described implementations can each, optionally, include one or more of the following features:

A first feature, combinable with any of the following features, further comprising one or more instructions to integrate the centralized database with a real-time drilling operation data source.

A second feature, combinable with any of the previous or following features, further comprising one or more instructions to perform quality control (QC) and quality analysis (QA) on the raw, real-time drilling data.

A third feature, combinable with any of the previous or following features, wherein the QC and QA is performed to remove noise from the raw, real-time drilling data.

A fourth feature, combinable with any of the previous or following features, wherein the real-time drilling data is stored in a Wellsite Information Transfer Standard Markup Language (WITSML) format and re-formatted into a comma-separated value (CSV) format.

A fifth feature, combinable with any of the previous or following features, further comprising one or more instructions to: analyze and classify the re-formatted data; perform trend-based analysis on the re-formatted data; obtain calculated and predicted values for the one or more data parameters; and push the calculated and predicted values for the one or more data parameters to the centralized database.

A sixth feature, combinable with any of the previous or following features, wherein the received output data is reformatted from a comma-separated value (CSV) format into a Wellsite Information Transfer Standard Markup Language (WITSML) format.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: pulling raw, real-time drilling data from a centralized database for processing; re-formatting the raw, real-time drilling data into a format required for processing by one or more predictive models; performing real-time processing with respect to one or more drilling parameters associated with the re-formatted data using the one or more predictive models to generate output data; re-formatting the output data received from the one or more predictive models for storage in the centralized database; and retrieving the reformatted output data from the centralized database for analysis with respect to visualization, generating alerts, or generating recommendations.

The foregoing and other described implementations can each, optionally, include one or more of the following features:

A first feature, combinable with any of the following features, further comprising one or more operations to integrate the centralized database with a real-time drilling operation data source.

A second feature, combinable with any of the previous or following features, further comprising one or more operations to perform quality control (QC) and quality analysis (QA) on the raw, real-time drilling data.

A third feature, combinable with any of the previous or following features, wherein the QC and QA is performed to remove noise from the raw, real-time drilling data.

A fourth feature, combinable with any of the previous or following features, wherein the real-time drilling data is stored in a Wellsite Information Transfer Standard Markup Language (WITSML) format and re-formatted into a comma-separated value (CSV) format.

A fifth feature, combinable with any of the previous or following features, further comprising one or more operations to: analyze and classify the re-formatted data; perform trend-based analysis on the re-formatted data; obtain calculated and predicted values for the one or more data parameters; and push the calculated and predicted values for the one or more data parameters to the centralized database.

A sixth feature, combinable with any of the previous or following features, wherein the received output data is reformatted from a comma-separated value (CSV) format into a Wellsite Information Transfer Standard Markup Language (WITSML) format.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, or both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any described concept or on the scope of what can be claimed, but rather as descriptions of features that can be specific to particular implementations of the described concept. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   pulling raw, real-time drilling data from a centralized database for processing;
   re-formatting the raw, real-time drilling data according to a format required for processing by one or more predictive models;

performing real-time processing with respect to one or more drilling parameters associated with the re-formatted data using the one or more predictive models to generate output data, wherein the real-time processing comprises:
  identifying a time interval during which mud flow-in values are within a fluctuation threshold, wherein the identified interval is divided into a first portion and a second portion;
  determining an average value of a stand pipe pressure (SPP) parameter within the first portion of the identified time interval;
  determining an extrapolated value of the SPP parameter based on the determined average value of the SPP parameter within the first portion of the identified time interval;
  comparing the extrapolated value of the SPP parameter with actual values of the SPP parameter in the second portion of the identified time interval; and
  determining an abnormal drilling event based on the comparing;
re-formatting the output data received from the one or more predictive models according to a format used for storage in the centralized database; and
retrieving the re-formatted output data from the centralized database for analysis with respect to visualization, generating alerts, or generating recommendations.

2. The computer-implemented method of claim 1, further comprising integrating the centralized database with a real-time drilling operation data source.

3. The computer-implemented method of claim 1, further comprising performing quality control (QC) and quality analysis (QA) on the raw, real-time drilling data.

4. The computer-implemented method of claim 3, wherein the QC and QA is performed to remove noise from the raw, real-time drilling data.

5. The computer-implemented method of claim 1, wherein the raw, real-time drilling data is stored in a Wellsite Information Transfer Standard Markup Language (WITSML) format and the format required for processing by one or more predictive models is a comma-separated value (CSV) format.

6. The computer-implemented method of claim 1, further comprising:
  analyzing and classifying the re-formatted data;
  performing trend-based analysis on the re-formatted data;
  obtaining calculated and predicted values for one or more data parameters; and
  pushing the calculated and predicted values for the one or more data parameters to the centralized database.

7. The computer-implemented method of claim 1, wherein the received output data is re-formatted from a comma-separated value (CSV) format into a Wellsite Information Transfer Standard Markup Language (WITSML) format.

8. A non-transitory, computer-readable medium storing one or more instructions executable by a computer system to perform operations comprising:
  pulling raw, real-time drilling data from a centralized database for processing;
  re-formatting the raw, real-time drilling data according to a format required for processing by one or more predictive models;
  performing real-time processing with respect to one or more drilling parameters associated with the re-formatted data using the one or more predictive models to generate output data, wherein the real-time processing comprises:
    identifying a time interval during which mud flow-in values are within a fluctuation threshold, wherein the identified interval is divided into a first portion and a second portion;
    determining an average value of a stand pipe pressure (SPP) parameter within the first portion of the identified time interval;
    determining an extrapolated value of the SPP parameter based on the determined average value of the SPP parameter within the first portion of the identified time interval;
    comparing the extrapolated value of the SPP parameter with actual values of the SPP parameter in the second portion of the identified time interval; and
    determining an abnormal drilling event based on the comparing;
  re-formatting the output data received from the one or more predictive models according to a format used for storage in the centralized database; and
  retrieving the re-formatted output data from the centralized database for analysis with respect to visualization, generating alerts, or generating recommendations.

9. The non-transitory, computer-readable medium of claim 8, further comprising one or more instructions to integrate the centralized database with a real-time drilling operation data source.

10. The non-transitory, computer-readable medium of claim 8, further comprising one or more instructions to perform quality control (QC) and quality analysis (QA) on the raw, real-time drilling data.

11. The non-transitory, computer-readable medium of claim 10, wherein the QC and QA is performed to remove noise from the raw, real-time drilling data.

12. The non-transitory, computer-readable medium of claim 8, wherein the raw, real-time drilling data is stored in a Wellsite Information Transfer Standard Markup Language (WITSML) format and the format required for processing by one or more predictive models is a comma-separated value (CSV) format.

13. The non-transitory, computer-readable medium of claim 8, further comprising one or more instructions to:
  analyze and classify the re-formatted data;
  perform trend-based analysis on the re-formatted data;
  obtain calculated and predicted values for one or more data parameters; and
  push the calculated and predicted values for the one or more data parameters to the centralized database.

14. The non-transitory, computer-readable medium of claim 8, wherein the received output data is re-formatted from a comma-separated value (CSV) format into a Wellsite Information Transfer Standard Markup Language (WITSML) format.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    pulling raw, real-time drilling data from a centralized database for processing;

re-formatting the raw, real-time drilling data according to a format required for processing by one or more predictive models;
performing real-time processing with respect to one or more drilling parameters associated with the re-formatted data using the one or more predictive models to generate output data, wherein the real-time processing comprises:
- identifying a time interval during which mud flow-in values are within a fluctuation threshold, wherein the identified interval is divided into a first portion and a second portion;
- determining an average value of a stand pipe pressure (SPP) parameter within the first portion of the identified time interval;
- determining an extrapolated value of the SPP parameter based on the determined average value of the SPP parameter within the first portion of the identified time interval;
- comparing the extrapolated value of the SPP parameter with actual values of the SPP parameter in the second portion of the identified time interval; and
- determining an abnormal drilling event based on the comparing;

re-formatting the output data received from the one or more predictive models according to a format used for storage in the centralized database; and
retrieving the re-formatted output data from the centralized database for analysis with respect to visualization, generating alerts, or generating recommendations.

16. The computer-implemented system of claim 15, further comprising one or more operations to integrate the centralized database with a real-time drilling operation data source.

17. The computer-implemented system of claim 15, further comprising one or more operations to perform quality control (QC) and quality analysis (QA) on the raw, real-time drilling data, and wherein the QC and QA is performed to remove noise from the raw, real-time drilling data.

18. The computer-implemented system of claim 15, wherein the raw, real-time drilling data is stored in a Wellsite Information Transfer Standard Markup Language (WITSML) format and the format required for processing by one or more predictive models is a comma-separated value (CSV) format.

19. The computer-implemented system of claim 15, further comprising one or more operations to:
- analyze and classify the re-formatted data;
- perform trend-based analysis on the re-formatted data;
- obtain calculated and predicted values for one or more data parameters; and
- push the calculated and predicted values for the one or more data parameters to the centralized database.

20. The computer-implemented system of claim 15, wherein the received output data is re-formatted from a comma-separated value (CSV) format into a Wellsite Information Transfer Standard Markup Language (WITSML) format.

* * * * *